E. I. JAFFE.
SHAPING AND CUTTING DIE.
APPLICATION FILED JUNE 30, 1914.
1,192,066.
Patented July 25, 1916.
2 SHEETS—SHEET 2.
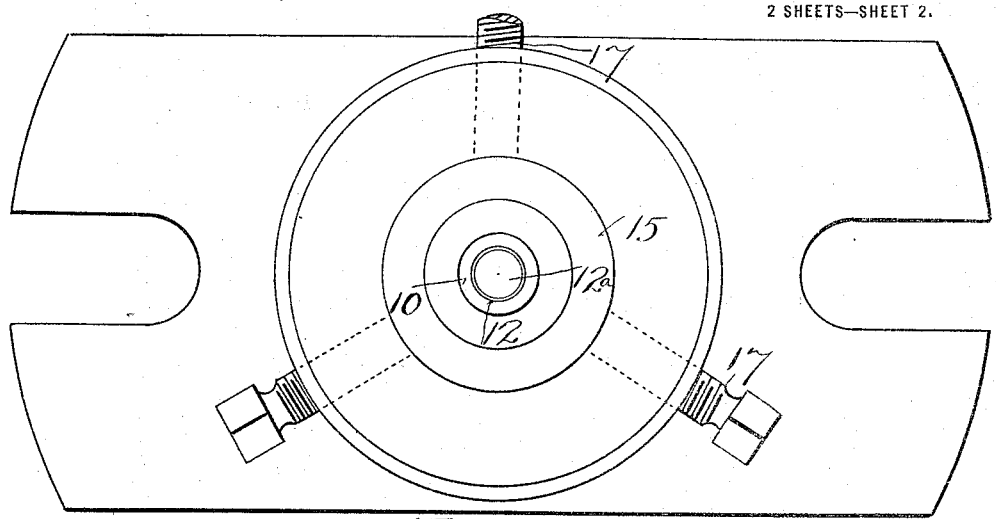
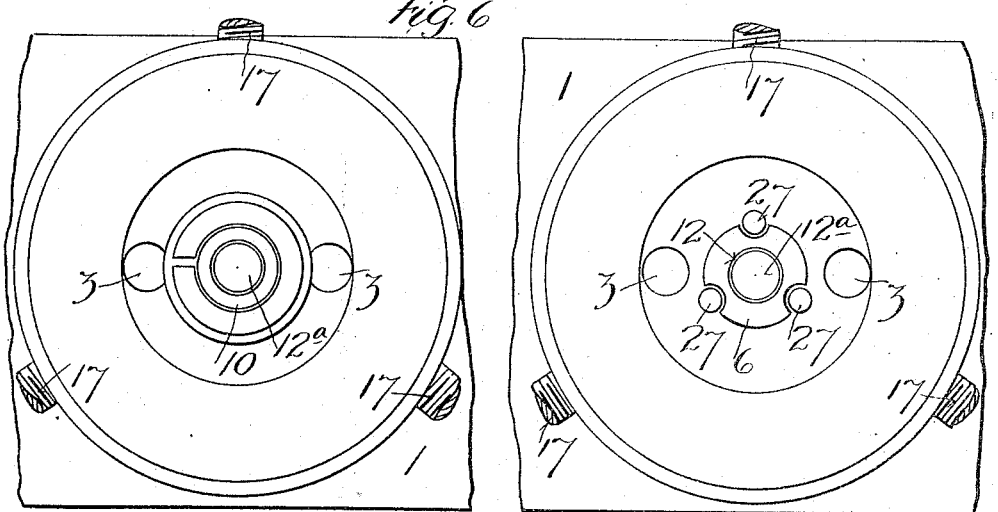
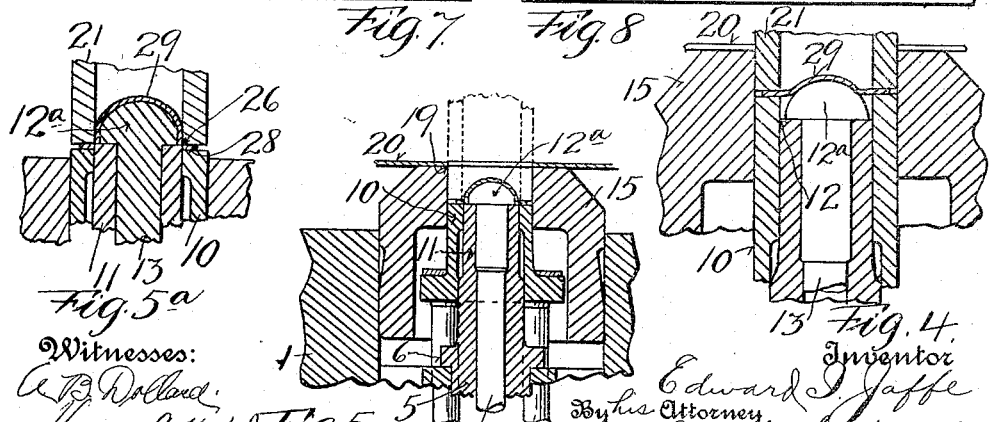

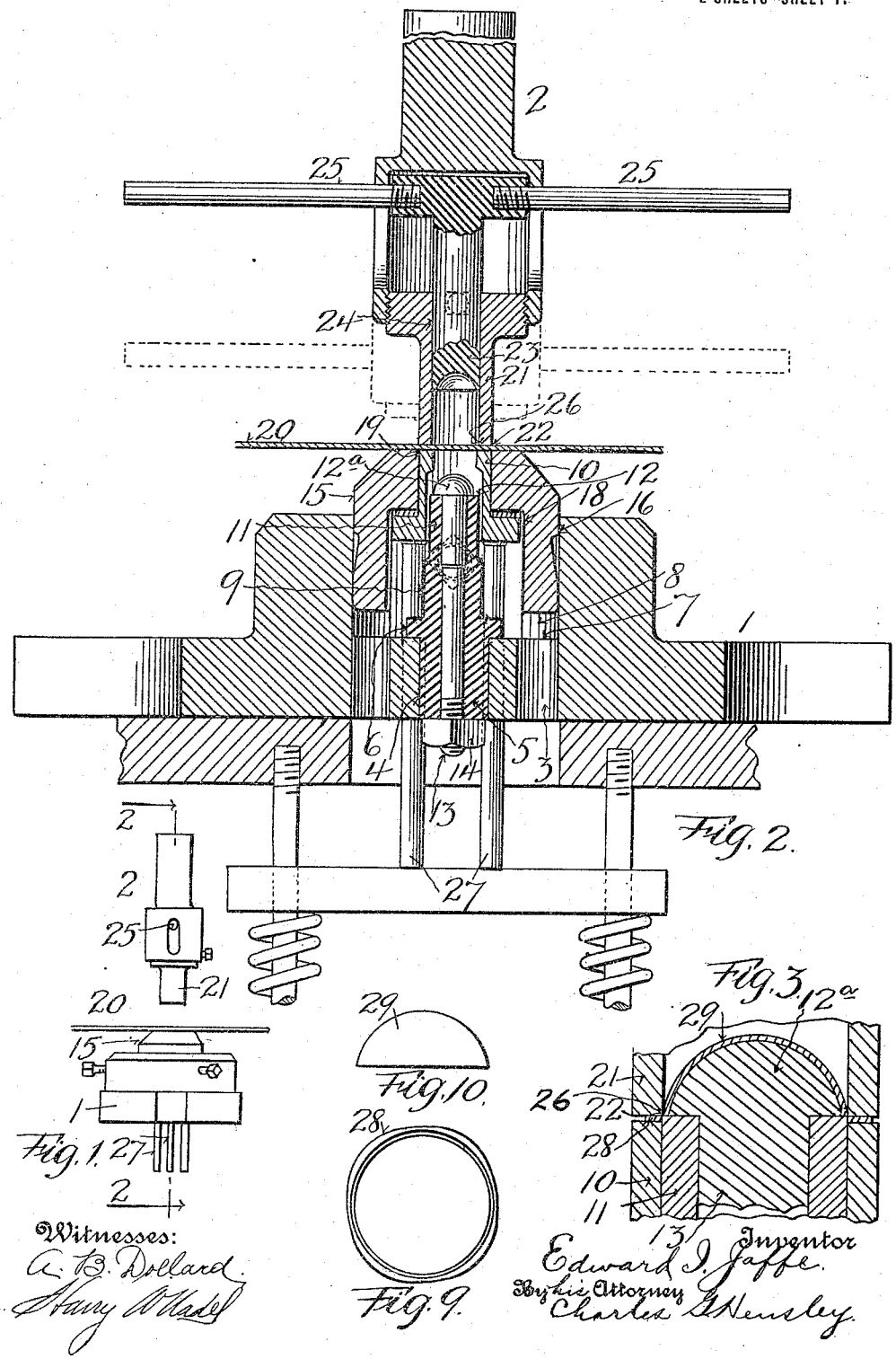

UNITED STATES PATENT OFFICE.

EDWARD I. JAFFE, OF NEW YORK, N. Y., ASSIGNOR TO O. K. BUTTON MOULDS M'F'G CO., OF NEW YORK, N. Y., A CORPORATION OF NEW YORK.

SHAPING AND CUTTING DIE.

1,192,066.   Specification of Letters Patent.   Patented July 25, 1916.

Application filed June 30, 1914. Serial No. 848,137.

*To all whom it may concern:*

Be it known that I, EDWARD I. JAFFE, a citizen of the United States, and a resident of the city, county, and State of New York, have invented certain new and useful Improvements in Shaping and Cutting Dies, of which the following is a specification.

My invention relates to dies for shaping and cutting and is more especially adapted for operating upon sheet metal.

I have applied my invention to the manufacture of button molds and I will describe the invention in connection with such application, although it is to be understood that it is applicable to various kinds of work.

The principal object of my invention is to provide a die by means of which metal may be shaped and cut or trimmed all in one operation.

Another object is to cut the blank from the sheet, as well as shape it and cut or trim the mold after it has been cut from the sheet, all in one operation.

One important advantage thereof is, that there is a saving in cost of the product, because the several steps are all performed in the one operation and there is therefore no necessity for handling the product after the shaping operation and before the cutting or trimming operation.

Heretofore it has been customary in making articles, such as button molds, of sheet metal, to shape the metal in one die and leave the molds with a rough or irregular bottom edge which is very objectionable, or else the metal mold was trimmed in a separate die. The latter case necessitated the handling of the product a second time. Furthermore, there was more or less irregularity in the product, due to the fact that the metal does not always draw the same during the shaping operation, even though the thickness of the metal is uniform, because it varies more or less in ductility. These objections are overcome by the present invention.

Another object of my invention is to produce regularly shaped products of uniform size by shaping and cutting at one operation. No matter how irregular the metal may draw in the shaping operation, due to variations in the ductility of the metal, the finished product will be of uniform size.

When the shaping post is once driven into place in the bed of a die it is almost impossible to drive it out and afterward drive it back into place without changing its location, slightly, with relation to the cutting portions of the die which sever the blank from the sheet preceding the shaping of the blank. For this reason it has been impracticable to change the shape after it has once been positioned. Under my invention it is possible to change the shape whenever desired, because the shape and its post are separable, and the post may be driven into the bed and it may remain there, whereas the shape may be replaced as many times as desired. If desired, different shapes may be substituted one for the other in the same die, if the base diameter of the product is not to be altered. Thus spheroidal, conical and pyramidal shapes may be all interchangeable in the same die without affecting the accuracy of the registering parts.

In the drawings forming part of this application, Figure 1 is an elevation of a die embodying my invention, Fig. 2 is a sectional view, on a larger scale, and taken on the line 2—2 of Fig. 1, Fig. 3 is an enlarged sectional view showing several of the parts just at the moment of the second cutting or trimming step of the operation, Fig. 4 shows the parts in the act of shaping, Fig. 5 is a sectional view, showing the parts just at the moment the trimming or second cutting step is being performed, Fig. 5ᵃ is a similar view, on an enlarged scale, showing the parts just as the final cutting operation is completed, Fig. 6 is a plan view of the lower half of the die, in assembled condition, Fig. 7 is a similar view, with the female die member removed, Fig. 8 is a similar view, with the female die member and the shaping ring removed, Fig. 9 is a plan view of the piece which is trimmed or cut off the mold just as the operation is completed, and Fig. 10 is an elevation of one form of completed mold.

The results herein set forth are accomplished principally by making the shape and its post separately and in such a manner that the post will act as a male die member at the moment the trimming or final cutting takes place.

In the drawings I have shown the lower die parts mounted in a bed 1 of usual construction, which bed may be mounted in any well known manner in the press. The upper die parts are carried in the movable head 2 which is reciprocated toward and from the bed 1 in well known manner.

The bed 1 has apertures 3, and there is a vertical aperture 4 in the bed to receive the post. In the form herein shown, the post comprises a lower portion 5 which is adapted to be driven into the aperture 4 of the bed; a flange 6 which rests upon the surface 7 of the bed and within the socket 8; an upper portion 9 over which the ring 10 slides; and a reduced upper end 11 having a cutting edge 12. The ring 10, which coöperates with the male die member in drawing the metal down over the shape, slides up and down and is guided by the post. The shape here shown has a spheroidal top $12^a$, although this is only shown by way of example. The shape $12^a$ rests upon the top of the post and it has a shank 13 which extends down through a central bore in the post and is threaded at its lower end to receive a nut 14 which serves to hold the shape firmly in place.

The female die member 15 fits into the socket 16 and is held in place by the bolts 17. This die member has a chamber 18 to receive the ring 10, the shape and post; and its upper, cutting edge 19 coöperates with the male die member to cut out the blank from the sheet 20 fed thereto.

The upper or male die member 21 is of proper size to enter the female die member, and its outer cutting edge 22 coöperates with the cutting edge 19 in severing the blank from the sheet. There is an ejector 23 which reciprocates in the bore 24 of the male die member and its hollowed lower end operates to eject the molds from the male die member when they are carried up by the latter, above the female die member, following the completion of the several operations. The ejector has lateral arms 25 which are actuated in well known manner upon the upward movement of the male die member.

The bore 24 of the male die member in the present arrangement not only provides space for the ejector to move in, but it also provides for an additional function for the die member. That is, the upper die member acts first as a male die member and then as a female die member; and it first coöperates with the member 15 as a male die member and then with the top of the post as a female die member. The edge 26 is preferably not sharpened so that it will not injure the blank by cutting or scraping it during the drawing operation.

Operation: In the manufacture of button molds the sheet 20 of metal is fed between the die members while they are separated. Upon the movement downwardly of the male die member the edge 22 of the male die and the edge 19 of the female die sever a blank, say, of a circular piece of metal, from the sheet. When this operation commences, the top of the ring 10 is held even with the top of the female die member and under the sheet 20 by the usual means, such as the spring forced rods 27. As the male die forces the blank downwardly following the cutting of the blank from the sheet, the ring 10 in contact with the edge of the blank, is forced downwardly by the descending male die; and the blank is from then on held between the male die and the ring, at its edge. As the male die and ring continue to move downwardly they draw the blank over the shape, and the blank gradually assumes the form of the shape. As this operation continues, part of the metal between the male die and ring is drawn inwardly to constitute part of the mold, but at the completion of the drawing operation some part of the edge remains between the male die and the ring. Ordinarily the male die member returns upon the completion of the drawing action, without further function, and the metal edge gripped by the male die and ring is either all drawn over the shape, or it is left projecting at right angles to the mold and afterward removed by a separate trimming operation. If this extra metal is left on the lower edge of the mold it is objectionable because it leaves an irregular edge which interferes with the manufacture of a perfect button and it tends to wear or break through the button material. This metal is not always uniform in extent and therefore if it remains on the mold the dimension of the product is not uniform. The metal varies in ductility, because in places it may be harder than in others, or one sheet may be harder than another. As a result, more or less of the rim held between the male die and the ring will be drawn in to form part of the mold, thus leaving the rims of varying dimensions; or, where all the metal is drawn the molds are not uniform in size. In the present case these objectionable features are avoided. At or about the time of drawing of the blank over the shape is completed, the interior or female edge 26 of the upper die coöperates with the edge 12 of the post to cut or trim off the metal at the bottom of the shape; or to cut away the portion of the metal remaining held between the male die and the ring. It is to be noted that the top of the post is of slightly greater dimension than the base of the shape and the difference corresponds, substantially, with the thickness of the metal being drawn. Upon the completion of the last mentioned step, the male die member moves upwardly, and the ring 10 follows it. The finished mold, shown in Fig. 10, is carried up inside the die member, and the trimmed or waste ring 28, shown in Fig. 9, is carried up by the male die. When the male die moves free of the female die the ejector 23 ejects the mold 29 and it, together with the part 28, is cast out of the way, as by a blower, ready for another operation.

It will be noted that the upper die member first acts as a male die member and coöperates with the female die member to cut the blank, and it then acts as a female die member and coöperates with the post to trim the waste metal at the base of the shape. The finished product is necessarily uniform, no matter how the metal may vary in ductility; and the product is in finished condition when discharged from the die, instead of having a rough, irregular edge. If it is desired to produce molds of different formation, but having the same base measurement, this can be done by simply changing the shape 12ª. The latter is removed by unscrewing the nut 14 and withdrawing the shape. Another shape may be reinserted, and bolted in place of the one removed. If the base line is the same as the removed shape, the same die members may be used and they need no adjustment. With this substitute shape the operations will be performed as before, but the finished molds will conform to the configuration of this new shape. The shape 12ª may be removed at any time and the cutting edge 12 of the post may be sharpened.

Having described my invention, what I claim is:

1. A shaping and cutting die, comprising a bed, coöperating male and female die members, a shape, a post therefor mounted in said bed and extending laterally beyond the base of the shape, said shape being supported by said post and being removable independently of the post, said post being arranged to coöperate with a die member to sever the material at the base of the shape.

2. A shaping and cutting die, comprising coöperating male and female die members, a shape, a post therefor having a top extending laterally beyond the base of the shape, said post being arranged to coöperate with a die member to sever the material at the base of the shape.

3. A shaping and cutting die, comprising coöperating male and female die members, a shape, a post therefor, having a top extending laterally beyond the base of the shape, said post being arranged to coöperate with a die member to sever the material at the base of the shape, and a ring sliding on said post and coöperating with a die member to draw the material over said shape.

4. A shaping and cutting die, comprising a female die member for cutting the blank, a shape stationarily arranged relative to said die member, a post for said shape adapted to operate as a male die member in definite relation to the shape, a die member having inner and outer cutting edges and adapted to operate as a male and female die member, said latter die member coöperating with said first-mentioned die member to sever the blank, and then coöperating with the die member comprised by said post to sever the material near said shape, and means coöperating with said third die member to draw the material over said shape.

Signed at the city, county and State of New York, this 22d day of June, 1914.

EDWARD I. JAFFE.

Witnesses:
KARL WEILLER,
CHARLES G. HENSLEY.

Copies of this patent may be obtained for five cents each, by addressing the "Commissioner of Patents, Washington, D. C."